(12) United States Patent
Ben Shalom

(10) Patent No.: US 9,724,618 B2
(45) Date of Patent: Aug. 8, 2017

(54) COMPRESSIBLE VERTICAL CONNECTOR

(71) Applicant: PALZIV LTD., Emek Hamaayanot (IL)

(72) Inventor: Yosef Ben Shalom, Emek Hamaayanot (IL)

(73) Assignee: PALZIV LTD., Emek Hamaayanot (IL)

( * ) Notice: Subject to any disclaimer, the term of this patent is extended or adjusted under 35 U.S.C. 154(b) by 0 days.

(21) Appl. No.: 14/903,064

(22) PCT Filed: Jul. 17, 2014

(86) PCT No.: PCT/IL2014/050653
§ 371 (c)(1),
(2) Date: Jan. 6, 2016

(87) PCT Pub. No.: WO2015/008291
PCT Pub. Date: Jan. 22, 2015

(65) Prior Publication Data
US 2016/0136536 A1 May 19, 2016

Related U.S. Application Data

(60) Provisional application No. 61/847,578, filed on Jul. 18, 2013.

(51) Int. Cl.
*A63H 33/10* (2006.01)
*A63H 33/06* (2006.01)
(Continued)

(52) U.S. Cl.
CPC ......... *A63H 33/102* (2013.01); *A63H 33/065* (2013.01); *B32B 3/06* (2013.01);
(Continued)

(58) Field of Classification Search
CPC .... A63H 33/065; A63H 33/08; A63H 33/088; A63H 33/102; A63H 33/106;
(Continued)

(56) References Cited

U.S. PATENT DOCUMENTS 4,758,299 A   7/1988  Burke
5,622,444 A * 4/1997  Gronnevik ......... B65D 11/1833
                                                403/292
(Continued)

FOREIGN PATENT DOCUMENTS

CA   1 173 869   9/1984
EP   2 716 336   4/2014
(Continued)

*Primary Examiner* — Jonathan Masinick
(74) *Attorney, Agent, or Firm* — Mark M. Friedman

(57) ABSTRACT

The present invention relates to construction assemblies or modules. There are attachment members that are connected by pressing an elastic protrusion head through an aperture and threading the protrusion head from one side of the aperture to the other. As the area of the aperture is smaller than area of front projection plane of the protrusion head, threading the protrusion head into the aperture requires the deformation of the protrusion head. After traversing the aperture, the protrusion head returns to its non-deformed shape, and the protrusion neck is settled within the aperture.

5 Claims, 8 Drawing Sheets

(51) Int. Cl.

| | | |
|---|---|---|
| *F16B 3/00* | (2006.01) | |
| *F16B 5/06* | (2006.01) | |
| *F16B 17/00* | (2006.01) | |
| *B32B 5/18* | (2006.01) | |
| *B32B 7/02* | (2006.01) | |
| *B32B 25/04* | (2006.01) | |
| *B32B 25/14* | (2006.01) | |
| *B32B 25/20* | (2006.01) | |
| *B32B 3/06* | (2006.01) | |
| *B32B 3/26* | (2006.01) | |

(52) U.S. Cl.
CPC ............ *B32B 5/18* (2013.01); *B32B 7/02* (2013.01); *B32B 25/04* (2013.01); *B32B 25/14* (2013.01); *B32B 25/20* (2013.01); *F16B 3/00* (2013.01); *F16B 5/0614* (2013.01); *F16B 5/0664* (2013.01); *F16B 17/00* (2013.01); *B32B 3/266* (2013.01); *B32B 2266/025* (2013.01); *B32B 2307/50* (2013.01); *B32B 2307/51* (2013.01); *B32B 2479/00* (2013.01)

(58) Field of Classification Search
CPC ......... A63H 33/108; F16B 3/04; F16B 17/00; F16B 5/0614; F16B 5/0664; Y10T 403/7094; Y10T 403/7073
See application file for complete search history.

(56) References Cited

U.S. PATENT DOCUMENTS

| | | | |
|---|---|---|---|
| 5,853,313 A | 12/1998 | Zheng | |
| 5,876,813 A | 3/1999 | Bambara | |
| 5,910,038 A | 6/1999 | Zheng | |
| 6,126,506 A * | 10/2000 | Rudy | A63H 33/082 446/124 |
| D588,651 S * | 3/2009 | Sinisi | D21/501 |
| 7,833,077 B1 * | 11/2010 | Simmons, Jr. | A63H 33/08 446/127 |
| 2003/0211278 A1 | 11/2003 | Schaefer | |
| 2005/0014441 A1 * | 1/2005 | Matos | A63H 33/08 446/85 |
| 2005/0130553 A1 | 6/2005 | Maniquis et al. | |
| 2012/0032393 A1 * | 2/2012 | Leicht | A63H 33/106 273/156 |
| 2015/0275945 A1 * | 10/2015 | Compton | F16B 5/065 24/664 |

FOREIGN PATENT DOCUMENTS

| | | | | |
|---|---|---|---|---|
| FR | WO 2006128984 A1 * | 12/2006 | ............ | A42B 1/004 |
| GB | 2427371 A | 12/2006 | | |
| JP | 2006 055290 | 3/2006 | | |
| WO | 2007/002442 | 2/2007 | | |

* cited by examiner

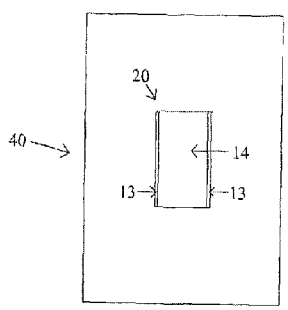
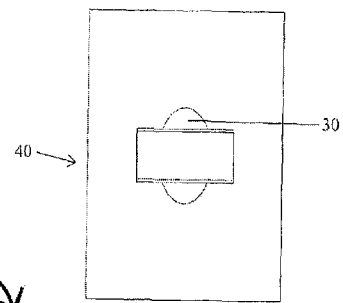
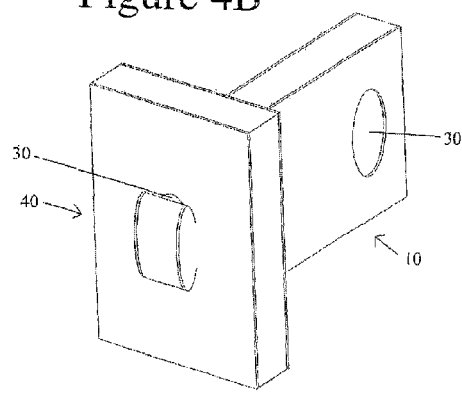
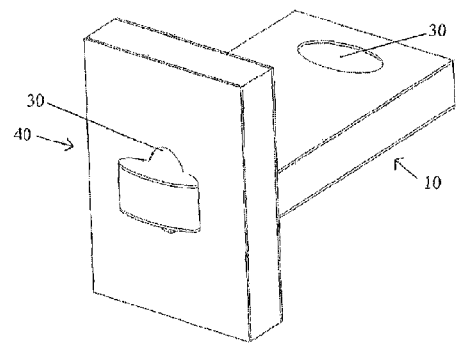
Figure 4B
Figure 5B
Figure 4A
Figure 5A

COMPRESSIBLE VERTICAL CONNECTOR

FIELD OF THE INVENTION

The present invention relates to construction assemblies.

BACKGROUND

In the mechanical trade and manufacturing, each half of a pair of mating connectors or fasteners is conventionally assigned the designation male or female. The "female" connector is generally a receptacle that receives and holds the "male" connector.

For example, the canonical LEGO® plastic blocks have "female" indentations on the lower surface, and "male" bosses or protrusions on the upper surfaces. Also, for example, articles like Stickle Bricks™, using interlocking plastic protrusions, and accordingly, are effectively genderless. Lincoln Logs® use a very simple form of genderless connections.

SUMMARY OF THE INVENTION

The present invention relates to compressible attachment members with a compressible protrusion. The compressibility of the protrusion allows for its unique geometry to engage apertures and lock in the same apertures.

The attachment members are connected by pressing the compressible protrusion head through an aperture and threading the protrusion head from one side of the aperture to the other. Threading the protrusion head into the aperture requires the deformation of the protrusion head. After traversing the aperture, the protrusion head returns to its initial or non-deformated shape, and the protrusion neck extends within the aperture.

The present invention relates to an attachment member comprising a compressible body including at least one compressible protrusion capable of changing dimensions when subject to pressure.

Optionally, the protrusion contains a neck portion and a head portion.

Another embodiment of the present invention is directed to an attachment member. The attachment member comprises, a layer made of compressible material between oppositely disposed plates, one of the plates defining an upper surface and the other plate defining a lower surface, each of the plates being pliable and substantially non-compressible.

The attachment member of this invention further includes at least one compressible protrusion capable of changing dimensions when subject to pressure.

According to this invention the protrusion containing a neck portion and a head portion.

In one embodiment of this invention each of the external plates is not greater than 10 mm thick.

In another embodiment of this invention attachment member further comprising 2, 4 or 6 layers in a manner that each compressible intermediate layer is attached at its top and bottom surfaces with elastic plates.

The present invention further relates to a set of attachment members comprising at least one of a first compressible attachment member and at least one of a second attachment member comprising an least one aperture.

In another embodiment of this invention the first compressible attachment member and the second attachment member are capable of being coupled by threading the protrusion head from one side of the aperture to the other.

In another embodiment of this invention the area of the front projection plane of the protrusion head portion is from 1.1 to 1.5 times larger than the surface area of the aperture.

In another embodiment of this invention the area of the front projection plane of the protrusion head portion is $4/\pi$ times larger than the surface area of the aperture.

In another embodiment of this invention the first compressible attachment member and the second attachment member has a lock configuration achieved by rotating the first compressible attachment member with respect to the second attachment member.

In another embodiment of this invention the aperture has a shape of ellipse.

BRIEF DESCRIPTION OF THE FIGURES

Some embodiments of the invention are herein described, by way of example only, with reference to the accompanying drawings, where like reference numerals or characters represent corresponding or like elements. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 4A and 4B show a further engagement phase of the exemplary operation of the articles of the present invention;

FIGS. 5A and 5B show a locking phase of the exemplary operation of the articles of the present invention;

DETAILED DESCRIPTION OF THE INVENTION

Figure 1:
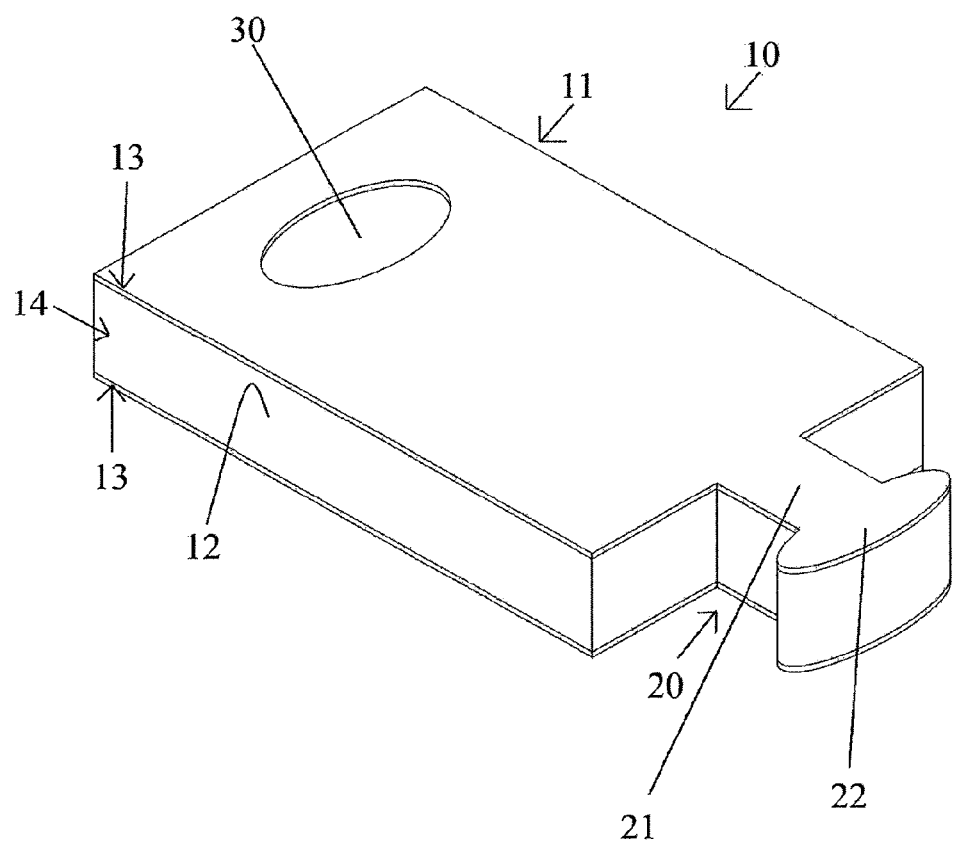
FIG. 1 is a perspective view of an embodiment of the present invention.
Figure 2:
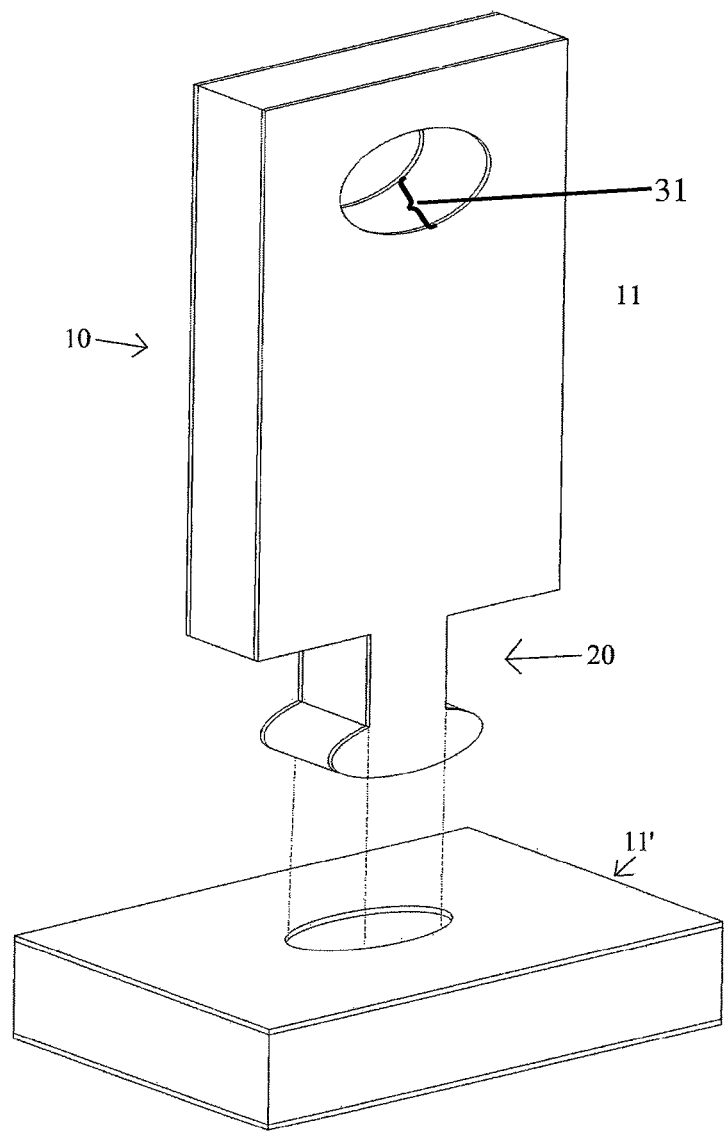
FIG. 2 is a perspective view of the article of FIG. 1 prior to connection with a connector member in accordance with embodiments of the present invention.
Figure 3B:
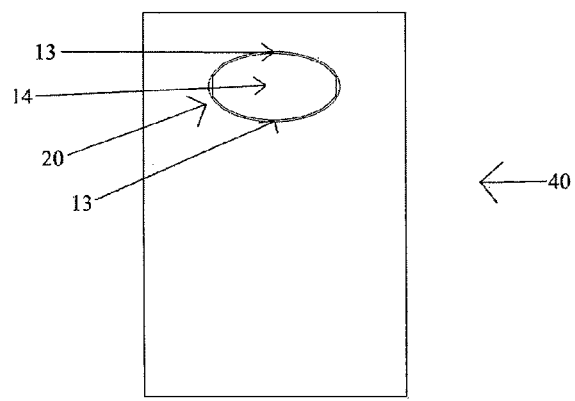
FIGS. 3A and 3B show an engagement phase of an exemplary operation of the articles of the present invention.
Figure 3A:
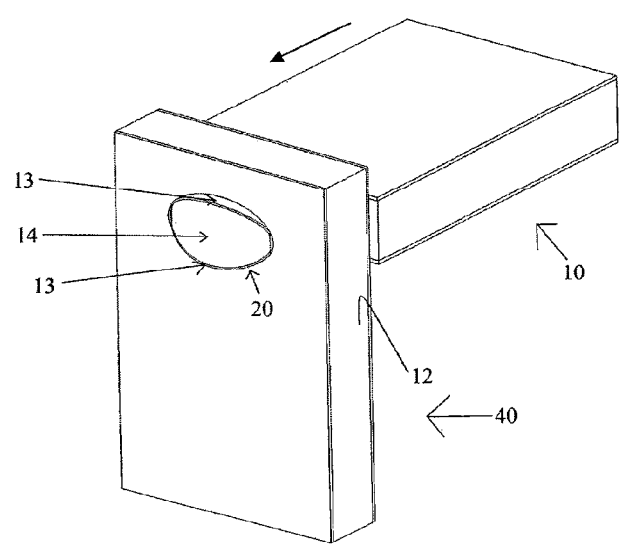
Figure 6:
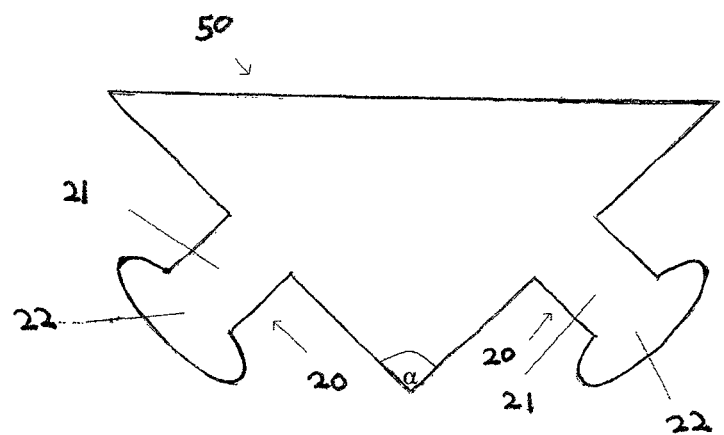
FIG. 6 shows a side view of an angle connector in accordance with embodiments of the present invention and, FIGS. 7A-7E are perspective views of exemplary assemblies which employ embodiments of the present invention.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Initially, throughout this document, references are made to directions such as, for example, upper and lower, top bottom, and the like. These directional references are exemplary only to illustrate the invention and embodiments thereof.

FIG. 1 shows an embodiment of an attachment member (male module) 10 in accordance with the present invention. The male module 10 is, for example, a unitary member, and includes a body portion 11 and a protrusion 20, exiting from the body portion 11. An intermediate layer 14 of a compressible material is positioned between oppositely disposed plates 13, for example, on the upper and lower sides. The plates 13 are, for example, of a resilient material which is substantially non-compressible. The plates 13 and intermediate layer 14 are, for example, form a flush outer surface 12.

The protrusion 20 is formed, for example, of a neck portion 21 and a head 22. The neck portion 21, is, for example, rectangular in shape, while the head 22 is, for example, rounded, and typically oval in shape. The neck portion 21, which extends between the body portion 11 and the head 22, is for example, of a length just slightly greater the thickness of the body portion 11 (which defines the length of the aperture 30, which extends through the body portion 11)). The shape of the top of the protrusion's head 22 may be but not limited to elliptic, round, rectangular, arrow-shaped, and triangular. The front projection plane of the protrusion's head may be either a polygon or an oval. The aperture 30 in the body portion 11 is for example, rounded in shape, and typically oval in shape, but may also be a polygon.

The present invention presents a construction assembly which contains protrusion-aperture connections and wherein the protrusion enters an aperture. In this invention, the protrusion is made of a compressible material. The compressibility of the protrusion allows high ratio of the area of the front projection plane of the protrusion's head to the area of the aperture. This ratio may range from 1.1 to 1.5. In another embodiment the ratio is between 1.2 and 1.4. In a another embodiment the ratio is between 1.25 and 1.35. In a another embodiment the ratio is $4/\pi$.

According to the present invention, threading the protrusion head into the aperture requires the deformation of the protrusion head. After traversing the aperture, the protrusion head returns to its non-deformated shape, and the protrusion neck is settled within the aperture.

As the area of the aperture is smaller than area of front projection plane of the protrusion head, threading of the protrusion head into the aperture requires the deformation of the protrusion head. To fit into the boundaries of the aperture, deformation of the intermediate layer 14 of the protrusion head during threading is mainly in the form of compression. Deformation of the relatively thin and stiff external elastic plates 13 is in the form of bending. As the intermediate layer 14 is sandwiched (=is placed) between the elastic plates 13 13, there may be certain areas in the intermediate layer 14 of the protrusion head that are more compressed than others during the passage of the protrusion head through the aperture. More preferably, the sides of the intermediate layer 14 of the protrusion head are more compressed than the central area of the protrusion head during this passage.

"Male construction module" or "male module" 10 means attachment member containing a protrusion. "Female construction module" or "female module" 40 means attachment member containing an aperture but without protrusion.

As known, inclination of surfaces and planes may be characterized by a vector that is normal (perpendicular) to that surface. In this invention, "side surface" of an attachment member is the surface on the circumference of the attachment member whose normal vector is parallel to the mating direction. "Top surface" and "bottom surface" are surfaces of opposite sides of the attachment member whose normal vectors are perpendicular (stands in 90°) to the mating direction. "Mating direction" means direction of movement of the protrusion when entering the aperture.

"Area of the aperture" means an area at the top or bottom surfaces that belong to the aperture. "Inner surface of the aperture" means a surface which constitutes the physical boundary of the aperture throughout the thickness of the attachment member. The inner surface of the aperture is a surface whose normal vector is parallel to the mating direction but it is not on the circumference of the attachment member.

Attachment member may be male module or female module. The attachment member comprising: body portion 11, and connection means selected from: compressible protrusion 20 and an aperture 30. The female module has also a body portion 11'. In one embodiment the top and bottom surfaces of the attachment member are flat planes. In this invention, the side surface 12 generates that general shape of the attachment member.

According to the present invention, the protrusion 20 includes a neck 21 portion and a head 22 portion. The head 22 portion may have variety of shapes such as oval or polygon. It is to be understood that "variety of shapes" in the previous sentence means variety of the shape of the top projection plane of the protrusion's head. Thus, the shape of the top projection plane of the protrusion's head may be but not limited to elliptic, round, rectangular, arrow-shaped, and triangular. The front projection plane of the protrusion's head may be either a polygon or an oval. In another embodiment, the front projection plane of the protrusion's head is a rectangular. In another embodiment the front projection plane of the protrusion's head is a rectangular and the shape of the aperture is an ellipse, where the ratio of areas of the plane and the aperture is $4/\pi$.

In a yet another embodiment, the front projection plane of the protrusion's head may be an oval. Thus in another embodiment, both the top projection plane and the front projection plane of the protrusion's head may be round. In this special case the head 22 portion is a ball and the entire attachment member is a cylindered rod. The cylindered rod may operable for use as a cylindered tenon for connecting or holding two other attachment members. It is to be understood that even when the attachment member is a cylindered rod, it contains a intermediate layer 14 made of elastically deformable material and two external elastic plates 13 attached to the intermediate layer 14, only that in the case of a rod each of the two external elastic plates 13 attached to the intermediate layer 14 is a half cylinder.

In one embodiment the male module contains one protrusion. In another embodiment, the male module may contain 2, 3, 4, 5 or even more protrusions. The male module may or may not contain an aperture. Each of the male module and the female module may have at one or more apertures. Each of the male module and the female module may have 2, 3, 4, 5 or even more apertures.

The at least one protrusion may extend from the attachment member's body portion anywhere on the circumference of the attachment member.

According to the present invention, there may be variability in the length of the neck. This variability corresponds with the variability of the thickness 31 of the aperture.

In another embodiment, the male module is composed of three flat layers attached to each other. The intermediate layer 14 is compressible and is thicker than the other two external layers and is compressible as opposed to the other two external layers. "Compressible" means has a tendency to change volume as a response to pressure.

In another embodiment of the invention, the male module may have more than three layers. The male module may have 5, 7 or 9 layers in a manner that each compressible "intermediate layer 14" as discussed throughout this application, is attached at its top and bottom surfaces with elastic plates 13.

In another embodiment, the male module contains an aperture. In a yet another embodiment the male module contains two or more apertures.

In one embodiment of the present invention, the composition of matter and the three layer-complex of the male module are identical to that of the female module. However, the composition of matter of the female module may be different than that of the male module. The composition of matter of the female module may be made of a single compressible material with uniform compressible features (compressible does not vary along the thickness). In another embodiment the composition of matter of the female module may be made of non-compressible materials such as hard plastic, wood, metal, glass, cardboard, paper, stone, porcelain, leather, artificial leather, plant fibers, ceramic and any combinations thereof. The requirement for three layered article of manufacture is from the protrusion and not from the aperture.

In the present invention, the intermediate layer 14 of the construction assembly is selected from natural elastomer, synthetic elastomer, thermoplastic elastomer, copolymers of polypropylene, copolymers of SEBS, styrene-butadiene copolymer, ethylene-vinyl acetate copolymer, very low density polyethylene, nitrile rubber, polychloroprene, neoprene, ethylenepropylene-diene monomer terpolymer (EPDM), butadiene-acrylonitrile copolymer, polyurethane, plasticized polyvinyl chloride, cross-linked rubber, and silicone rubber.

In another embodiment the intermediate layer 14 is made of polyethylene foam. In another embodiment the polyethylene foam is selected from evazote, soft pelite, medium pelite, aliplast 4E, aliplast 6A, medium plastazote and medium dermaplast.

The two external layers are identical to each other. In this invention the two external layers are designated as elastic plates 13 or external plates 13. The elastic plates 13 are stiffer than the intermediate layer 14. In another embodiment the elastic plates 13 are thinner than the intermediate layer 14. In another embodiment the thickness of the elastic plates 13 is no greater than 10 mm. The elasticity of the external plates 13 is mainly in the bending (or flexure) capabilities, rather than elasticity with respect to normal (=perpendicular) forces. The elastic plates 13 are significantly more rigid than the intermediate layer 14 but convey pliability with respect to bending. In another embodiment, the elastic plates 13 are non-compressible. This rigidity of the elastic plates 13 contributes to the physical stability of the male module and consequently to the entire construction assembly.

In another embodiment, the elastic plates 13 in an extrusion of the material the intermediate layer 14 is made of.

In another embodiment of the invention the surface of the elastic plates 13 is smoother than the exposed surface of the intermediate layer 14. This means that the friction coefficient of the surface of the elastic plates 13 is lower than that of the exposed surface of the intermediate layer 14. Smoothness of the surface of the elastic plates 13 enables easier threading of the protrusion into the aperture.

It should be understood that the protrusion is a protraction of the male module body portion 11 and that the protrusion 20 comes into being by shaping a portion of the male module 10 boundary. The protrusion 20 is produced by cutting the edge of a three layered attachment member so that the edge conveys a 'neck-and-head' shape of the protrusion 20. The composition-of-matter or texture of the male module does not vary along its length or width, but varies along its thickness 31. An exception to this is in the case where the attachment member is a rod. In this case the composition of matter or texture of the male module does not vary only along its length.

It should also be understood that no protrusions 20, pegs or shoulders exist neither throughout the inner surface of the aperture, nor anywhere at the protrusion 20. Thanks to the high compressibility of the intermediate layer 14 of the male module, the protrusion 20 is free of slits, splits, notches or any kind of thin extended stakes or protuberance.

According to the present invention the aperture may have variety of shapes such as round-shaped or polygon. In another embodiment the shape of the aperture is oval. In another embodiment the shape of the aperture is elliptic.

In a yet another embodiment, the shape of the aperture is a polygon that enables a specific coupling configuration of the protrusion 20 while being inside the aperture. This specific coupling configuration is called "lock" configuration. After the neck is inside the aperture, lock effect is achieved by a rotating of the protrusion's neck within the aperture to a certain angle with respect to its initial position. In the "lock" configuration, the protrusion's neck is kept tightly within the aperture. By "kept tightly within the aperture" means that more force is needed in order to rotate the protrusion 20 in the angular direction back to unlock position than to bringing it into lock position while being inside the aperture.

In another embodiment, the lock-enabling shape of the aperture comprises two opposite half rectangulars. The two opposite half rectangulars are responsible for grasping the protrusion's neck tightly when it is inside the vacancy of the aperture. In a more general manner, the lock effect is accomplished by a rotation of the protrusion's neck within the aperture in an angle that increases the surface of contact between the neck and the inner surface of the aperture.

In another embodiment, the far side of the aperture in the mating direction is not necessarily the open air. The far side may be a cavity or a recess in the hole-containing attachment member. In this case, after threading the aperture, the protrusion 20 head is entirely surrounded by the body portion of the hole-containing attachment member.

The size of the attachment member, either the male module or the female module may vary from as small as 9 cm$^2$ and may reach up to 9 m$^2$ or even larger.

Figure 7A:
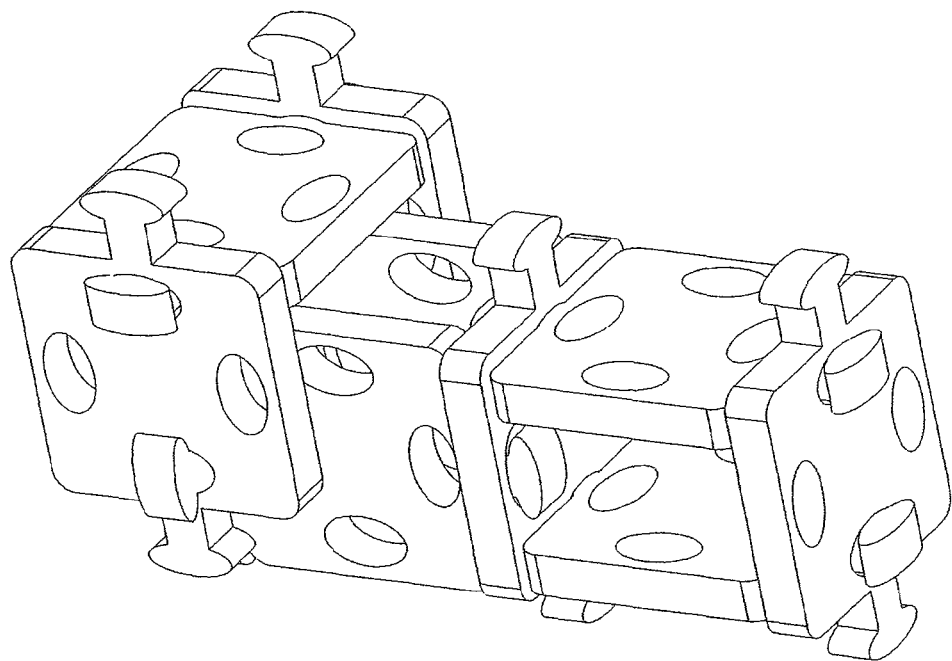
Figure 7B:
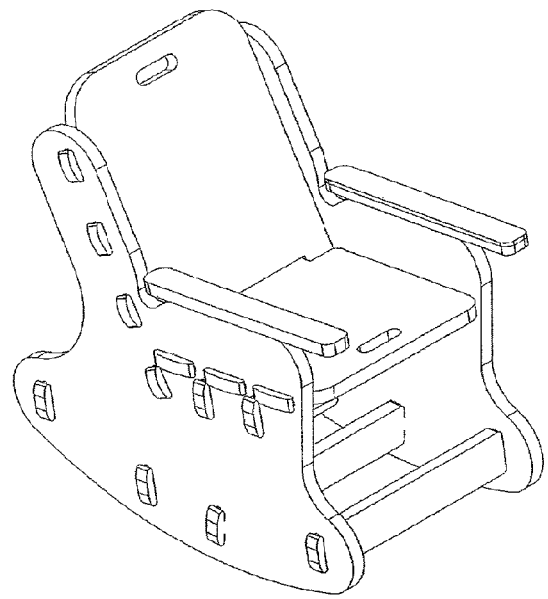
Figure 7C:
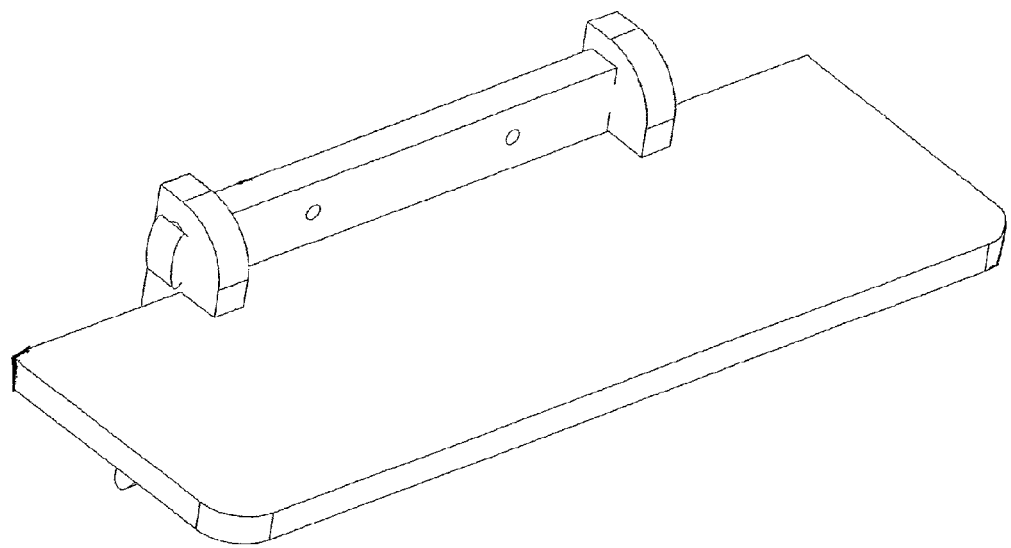
Figure 7D:
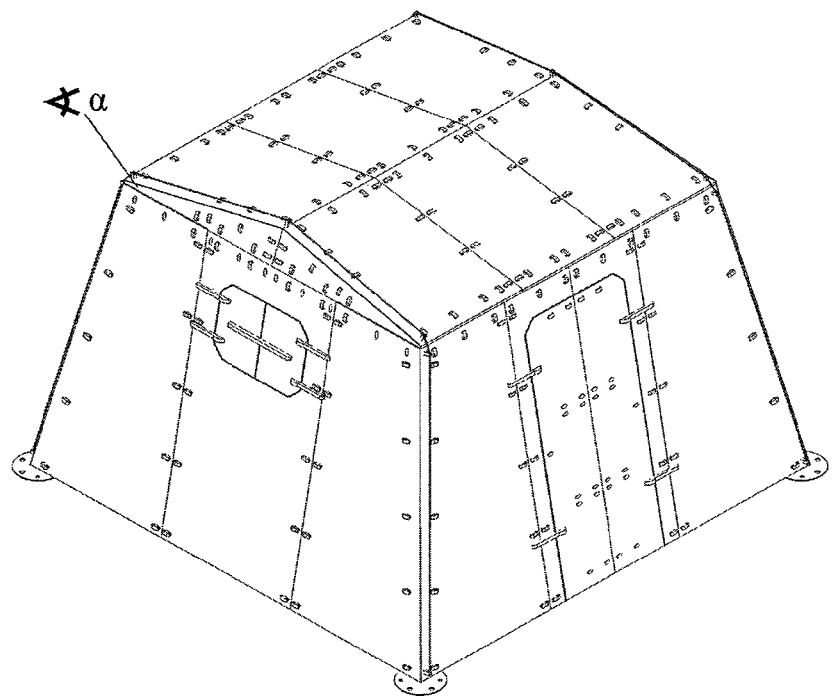
Figure 7D:
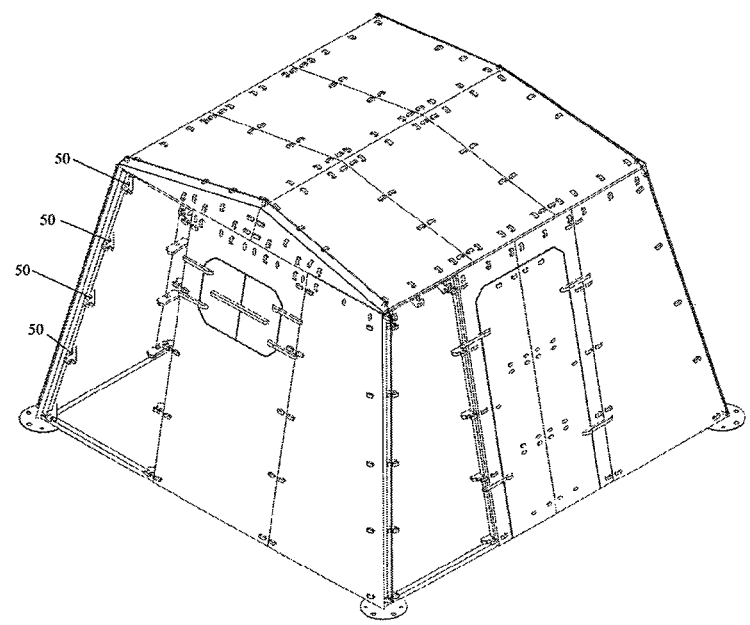

The protrusion 20 extends from the side surface 12 of the attachment member so that the protrusion 20 is perpendicular to at least part the side surface 12 of the surroundings of the protrusion 20. This means that when coupled, two attachment members are perpendicular to each other. However, in another embodiment of the invention, two attachment members are able to have an angle other than 90° when coupled. The angle between attachment members may be from 5° to 175°. In order that two attachment members may be coupled in an angle different than 90°, angle connectors 50 are used. FIGS. 7DA and 7DB shows an angle connector where the angle $\alpha$ determines the angle between attachment members. This angle and may range from 5° to 175°. FIGS. 7DA-7DB show an application of an angle connector employed in a tent.

The assembly according to the invention comprising in another embodiment a joint so that al least one portion of the assembly is movable.

Figure 7E:
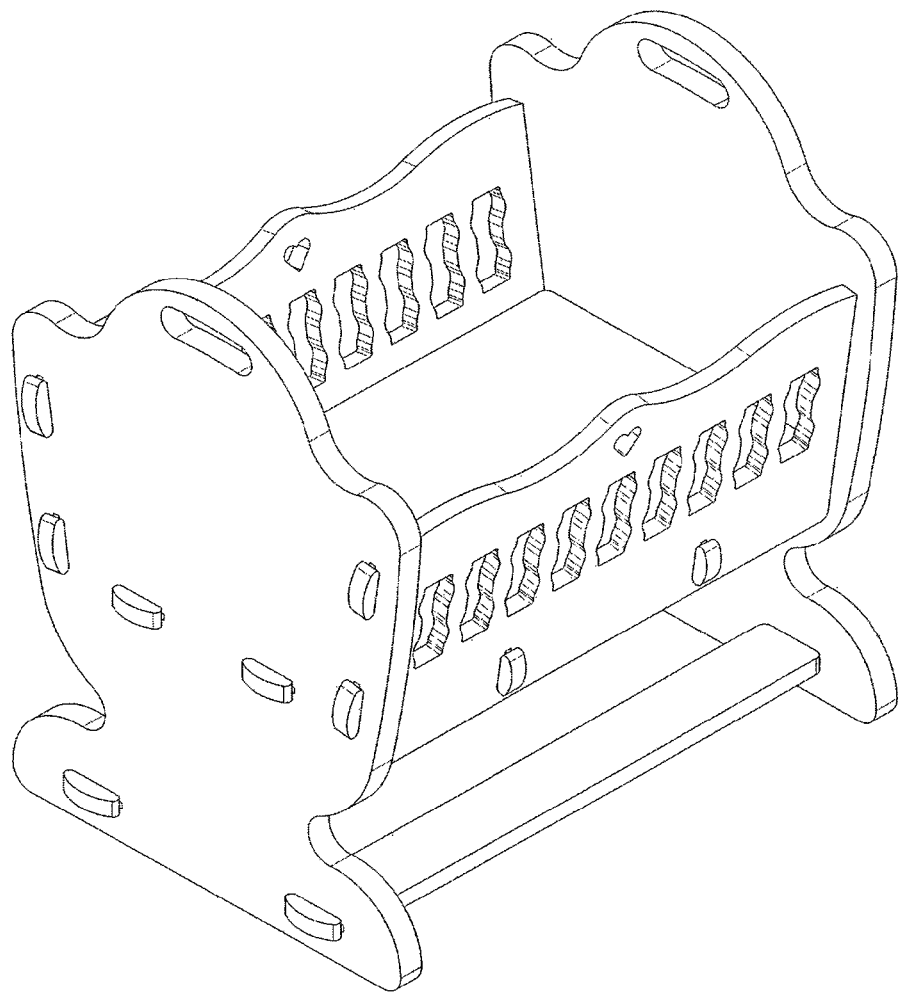

Many kinds of applications may be found for the attachment members of the present invention. Assemblies like toys (FIG. 7A), chairs (FIG. 7B), shelves (FIG. 7C), tents (FIGS. 7DA-7DB) and cradles (FIG. 7E) are only some examples.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination. Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

What is claimed is:

1. A set of attachment members comprising: a first attachment member having a sandwich structure comprising two bendable but incompressible outer layers bonded to and sandwiching a compressible layer, wherein said first attachment member comprises a protrusion having a neck portion connecting to a head portion, said neck portion having a first width and said head portion having a second width greater than said first width, said protrusion having a thickness; and a second attachment member having an aperture, said aperture having a length sufficient to accommodate said second width, said aperture having a breadth measured perpendicular to said length, said breadth having a first value in a central region of said aperture and decreasing along said length in both directions from said central region to a breadth that is less than said thickness of said protrusion so as to allow passage of said head portion through said aperture only when said outer layers are bent towards each other so as to compress said inner layer at lateral edges of said head portion, such that said lateral edges are more compressed than a central area of said head portion during passage through said aperture and expand after said head portion has passed through said aperture so as to resist withdrawal of said projection.

2. The set of attachment members of claim 1, wherein said aperture is shaped and sized such that, after passage of said head portion through said aperture, rotation of said first attachment member about an axis passing along said projection aligns said width of said head portion non-parallel with said length of said aperture so as to lock attachment of said first attachment member to said second attachment member.

3. The set of attachment members of claim 2, wherein edges of said aperture in said central region are formed with opposing angular recesses such that, when said first attachment member is rotated about said axis, edges of said neck portion become engaged within said opposing angular recesses so as to oppose an unlocking rotation of said first attachment member.

4. The set of attachment members of claim 1, wherein an area of a front projection of said head portion of said protrusion is between 1.1 and 1.5 times larger than an open area of said aperture.

5. The set of attachment members of claim 1, wherein said aperture is an elliptical aperture.

* * * * *